(12) United States Patent
Uchiike (10) Patent No.: US 8,384,510 B2
(45) Date of Patent: Feb. 26, 2013

(54) TRANSMISSION APPARATUS, METHOD FOR CONTROLLING TRANSMISSION APPARATUS, AND INFORMATION COMMUNICATION SYSTEM

(75) Inventor: Hiroshi Uchiike, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 12/437,866

(22) Filed: May 8, 2009

(65) Prior Publication Data

US 2009/0284388 A1 Nov. 19, 2009

(30) Foreign Application Priority Data

May 14, 2008 (JP) .................................. 2008-127457
Feb. 2, 2009 (JP) .................................. 2009-021827

(51) Int. Cl.
*G06F 13/42* (2006.01)
(52) U.S. Cl. .................................... 340/1.1; 348/207.99
(58) Field of Classification Search ................... 340/1.1, 340/4.11, 4.31, 12.22, 12.24, 12.5, 13.24, 340/539.1, 539.14; 348/207.99, 207.1, 207.11, 348/208.99, 208.1
See application file for complete search history.

(56) References Cited

FOREIGN PATENT DOCUMENTS
JP 5-236394 A 9/1993

OTHER PUBLICATIONS

Merged proposal: New PHY Layer and Enhancement of MAC for mmWave System Proposal; Nov. 13, 2007; IEEE P802.15 Working Group for Wireless Personal Area Networks (WPANs).

*Primary Examiner* — Nabil Syed
(74) *Attorney, Agent, or Firm* — Carter, DeLuca, Farrell & Schmidt LLP (57) ABSTRACT

When a communication between a camera and a television is performed utilizing a first wireless communication mode which employs high-directional radio transmission, and a second wireless communication mode which employs low-directional radio transmission with lower directivity than that of high-directional radio transmission, the television detects that the communication in the first wireless communication mode has been disconnected and notifies the camera. The camera determines whether or not the movement of the camera is the cause of disconnection in the first wireless communication mode. If the reason for disconnection is the movement of the camera, a control signal is transmitted to the television so as not to execute the process for an avoiding no-signal condition.

12 Claims, 3 Drawing Sheets

TRANSMISSION APPARATUS, METHOD FOR CONTROLLING TRANSMISSION APPARATUS, AND INFORMATION COMMUNICATION SYSTEM

BACKGROUND OF THE INVENTION

1. Field of the Invention

The present invention relates to a transmission apparatus, a method for controlling a transmission apparatus, and an information communication system.

2. Description of the Related Art

Conventionally, there has been proposed an information communication system by which a transmission apparatus such as a digital camera or a digital video camera and a receiving apparatus such as a television are connected via wireless communication. In this information communication system, it is envisaged that a camera and a television be connected via wireless communication, for example, in the millimeter wave band, or more specifically, in the 60-GHz band.

Wireless communication in the 60-GHz band provides high-capacity communication with a maximum speed of 5G bps. Through wireless communication in the 60-GHz band, moving images (hereinafter referred to as "1080p") having a pixel size of 1920×1080 with a frame frequency of 59.94 Hz can be transmitted via wireless communication. In a conventional information communication system using wireless communication in the 60-GHz band, a camera transmits the 1080p moving image to a television via wireless communication, so that the television reproduces the 1080p moving image. The 1080p moving image is configured to output normal image and voice data as well as still picture data as frame data.

Wireless communication in the 60-GHz band has very high directivity due to its short radio wavelength and high linear progressivity characteristics. Hence, the positional relationship between a transmission apparatus and a receiving apparatus or the condition of the transmission path have a greater impact on data transmission. For the physical layer of wireless communication in the 60-GHz band, there are two modes proposed for this: one is a single-carrier mode to be used in a point-to-point connection and the other is a multi-carrier mode for OFDM (orthogonal frequency division multiplex).

In view of the characteristics of high directivity of wireless communication in the 60-GHz band, the IEEE 802 Committee obligates implementing a common mode so as to ensure minimal communication between communicating devices. As disclosed in IEEE802.15-07-0934-01-003c, p12-14, p21-24, and p51-54, the common mode refers to the transmission mode using a single carrier wave with relatively low speed (about 50 Mbps), which is for use in obtaining or authenticating status information of the devices and transmitting a beacon signal.

Conventionally, television apparatuses with a power saving function are known. In the television apparatuses with the power saving function, if no signal input has been received from an external device such as a recorder for a predetermined period of time, a system power circuit is switched off or a monitor is turned off, whereby power consumption is reduced. As disclosed in Japanese Unexamined Patent Application Publication No. 5-236394, another method is such that if no input signal has been received for a predetermined period of time, an input switching circuit is switched to a terminal receiving a signal input, e.g., to a normal broadcast input, whereby a predetermined image is displayed on the screen. Since a user can view the predetermined image displayed and recognize that the power the television apparatus is not switched-off, whereby forgetting to turn the power off is prevented. In this way, such television apparatuses are common which, in a state of the absence of signal input from the signal input source, execute an operation such as turning the power off or turning off the monitor after a predetermined period of time, or switching to the other signal input source as the no-signal condition avoidance operation.

However, a conventional information communication system by which a transmission apparatus and a receiving apparatus are connected via wireless communication in the 60-GHz band has problems described below. When a user begins to view an image after the establishment of a connection between a transmission apparatus such as a camera and a receiving apparatus such as a television, the user may move the camera for operation. Under such circumstances, because of the high directivity of wireless communication in the 60-GHz band, communication may be terminated by the change of the positional relationship between the transmission apparatus and the receiving apparatus. In particular, when the transmission apparatus is a device such as a digital camera or a digital video camera, on the assumption that a user may pick up such device with his/her hands for operation, such problems become marked.

In such cases, the television detects the absence of signal input from the camera and executes a control operation for avoiding a no-signal condition such as turning off the power of the receiving apparatus after the elapse of a predetermined period of time. On the other hand, assume that in order to start viewing again, after the completion of an operation of the camera, a user places the camera at the original position, that is, the position where the connection has been established before the user has picked up the device. However, the television may have already been shifted to a power-off state at that point as a result of the avoidance of a no-signal condition. For this reason, the user may need to turn on the power of the television again, to handle the input switching process, or to re-establish the wireless connection settings. Consequently, there arises a problem in that viewing an image cannot readily be continued.

SUMMARY OF THE INVENTION

The present invention has been made in view of the aforementioned circumstances, and controls an operation of the no-signal condition avoidance process to be executed by a receiving apparatus depending on the condition of a transmission apparatus when data communication via wireless communication has been disconnected. An aspect of the present invention to provide a transmission apparatus in which the receiving apparatus can readily continue data processing with the aid of this control even if communication needs to be reconnected in order to continue the viewing of an image; a method for controlling a transmission apparatus; and an information communication system.

According to an aspect of the present inventions, a transmission apparatus is provided which performs wireless communication with a receiving apparatus that executes a no-signal condition avoidance process to avoid a no-signal condition utilizing a first wireless communication mode which employs high-directional radio transmission and a second wireless communication mode which employs low-directional radio transmission with lower directivity than high-directional radio transmission, if a no-signal condition occurs such that a signal input from the transmission apparatus is not present. The transmission apparatus includes a receiver that receives disconnection information from the receiving apparatus in the second wireless communication mode, wherein the disconnection information indicates that the first wireless communication mode has been disconnected; a detector that detects movement of the transmission apparatus; a determinator that determines whether or not the disconnection of wireless communication in the first wireless communication mode has been caused by the movement of the transmission apparatus using the result of the detection by the detector, if the disconnection information has been received during the transmission of data to the receiving apparatus in the first wireless communication mode; and a controller that controls the transmission of a suspension control signal for suspending the execution of the no-signal condition avoidance process to the receiving apparatus utilizing the second wireless communication mode, if it is determined by the determinator that the movement of the transmission apparatus has caused the disconnection of wireless communication in the first wireless communication mode.

According to another aspect of the present invention, a method is provided for controlling a transmission apparatus according to the present invention can perform wireless communication with a receiving apparatus that executes the no-signal condition avoidance process to avoid a no-signal condition utilizing a first wireless communication mode which employs high-directional radio transmission and a second wireless communication mode which employs low-directional radio transmission with lower directivity than that of high-directional radio transmission, if a no-signal condition occurs such that a signal input from the transmission apparatus is not present. The method includes receiving disconnection information from the receiving apparatus in the second wireless communication mode, wherein the disconnection information indicates that the first wireless communication mode has been disconnected; detecting movement of the transmission apparatus; determining whether or not the disconnection of wireless communication in the first wireless communication mode has been caused by the movement of the transmission apparatus using the result of the detection by the detecting step, if the disconnection information has been received during the transmission of data to the receiving apparatus in the first wireless communication mode; and controlling the transmission of a suspension control signal for suspending the execution of the no-signal condition avoidance process to the receiving apparatus utilizing the second wireless communication mode, if it is determined by the determining step that the movement of the transmission apparatus has caused the disconnection of wireless communication in the first wireless communication mode.

According to yet another aspect of the present invention, an information communication system includes a transmission apparatus that transmits data utilizing wireless communication; and a receiving apparatus for receiving data transmitted via wireless communication from the transmission apparatus, wherein wireless communication between the transmission apparatus and the receiving apparatus utilizes a first wireless communication mode which employs high-directional radio transmission and a second wireless communication mode which employs low-directional radio transmission with lower directivity than that of high-directional radio transmission. The receiving apparatus includes a controller that executes a no-signal condition avoidance process to avoid a no-signal condition, if a no-signal condition occurs such that a signal input from a transmission apparatus is not present. The transmission apparatus includes a receiver that receives disconnection information from the receiving apparatus in the second wireless communication mode, wherein the disconnection information indicates that the first wireless communication mode has been disconnected; a detector that detects movement of the transmission apparatus; a determinator for determining whether or not the disconnection of wireless communication in the first wireless communication mode has been caused by the movement of the transmission apparatus using the result of the detection by the detector, if the disconnection information has been received during the transmission of data to the receiving apparatus in the first wireless communication mode; and a controller that controls the transmission of a suspension control signal for suspending the execution of the no-signal condition avoidance process to the receiving apparatus utilizing the second wireless communication mode, if it is determined by the determinator that the movement of the transmission apparatus has caused the disconnection of wireless communication in the first wireless communication mode.

Further features and aspects of the present invention will become apparent from the following description of exemplary embodiments with reference to the attached drawings.

DESCRIPTION OF THE EMBODIMENTS

Hereinafter, various embodiments, features and aspects of the present invention will be explained with reference to the attached drawings.

Figure 1:
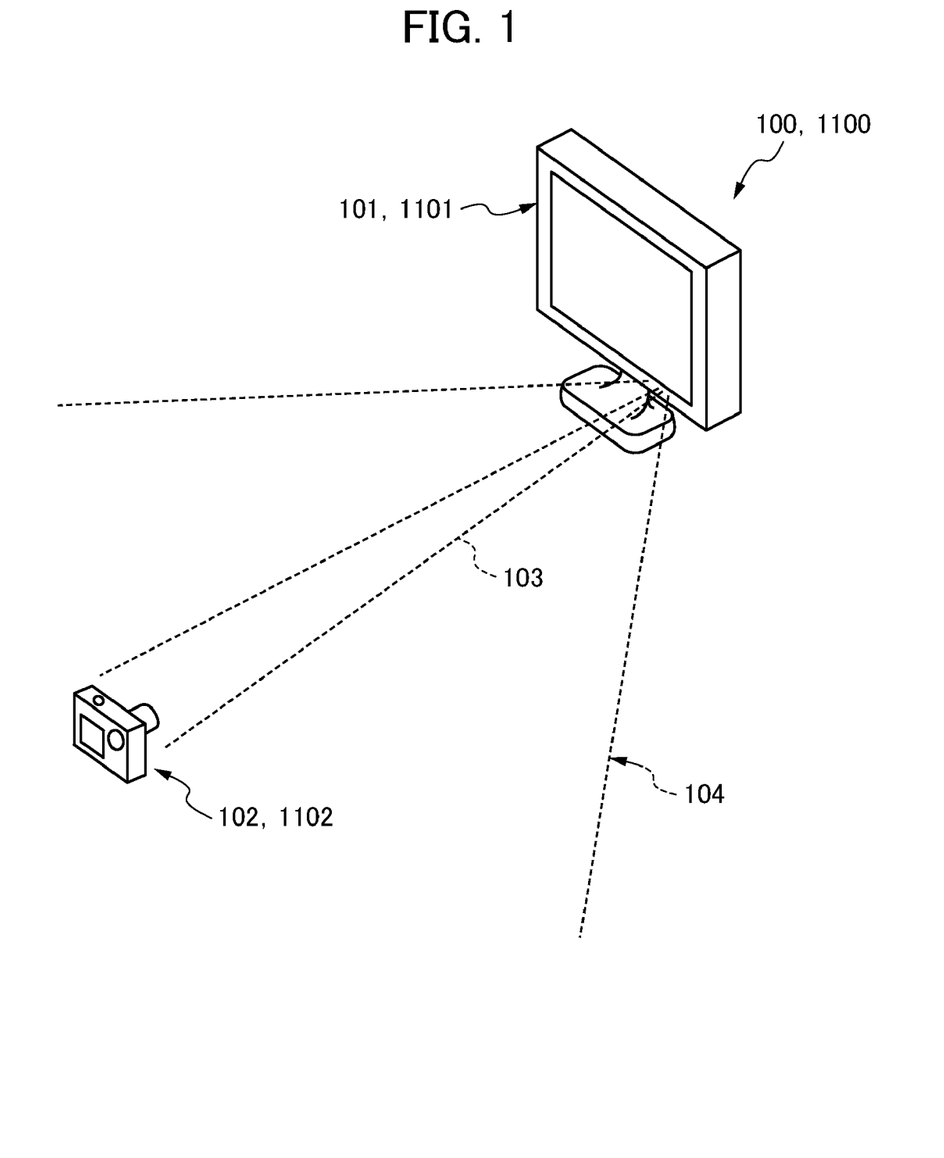
FIG. 1 is a diagram showing an example of the information communication system according to the embodiment of the present invention.

FIG. 1 shows an example configuration of an information communication system 100 according to a first embodiment of the present invention. The information communication system 100 includes a television apparatus (hereinafter referred to as "television") 101, which is a receiving apparatus; and a camera 102, which is a transmission apparatus.

The information communication system 100 has a function which provides two wireless communication modes, i.e., the wireless communication mode for high-speed data transmission and the wireless communication mode for low-speed data transmission. The wireless communication mode for high-speed data transmission is a first wireless communication mode (hereinafter referred to as "beam mode") which is in accordance with wireless communication standard in the 60-GHz band and has high directivity using a single carrier wave or OFDM. The wireless communication mode for low-speed data transmission is a second wireless communication mode (hereinafter referred to as "common mode") with low directivity for use in minimally required communication.

In the information communication system 100, the television 101 and the camera 102 both have transmission and receiving functions for wireless signals in the 60-GHz band, and they are connected together via a transmission path 103 in the beam mode using the 60-GHz band. The television 101 and the camera 102 are also connected via a transmission path 104 in the common mode. The transmission path 103 in the beam mode can transmit data at high-speed, whereas the range available for the transmission path is narrow because of high directivity. The transmission path 104 in the common mode transmits data at low speed, whereas the range available for the transmission path is wide. FIG. 1 is presented only for clear illustration of an overview of the system of the present invention, the beam mode, and the common mode, but does not limit the configuration of the present invention. In the present invention, there is no restriction on the band, the transmission rate, and the high or low directivity of the respective modes except that the directivity of wireless communication in the beam mode is higher than that in the common mode.

Figure 2:
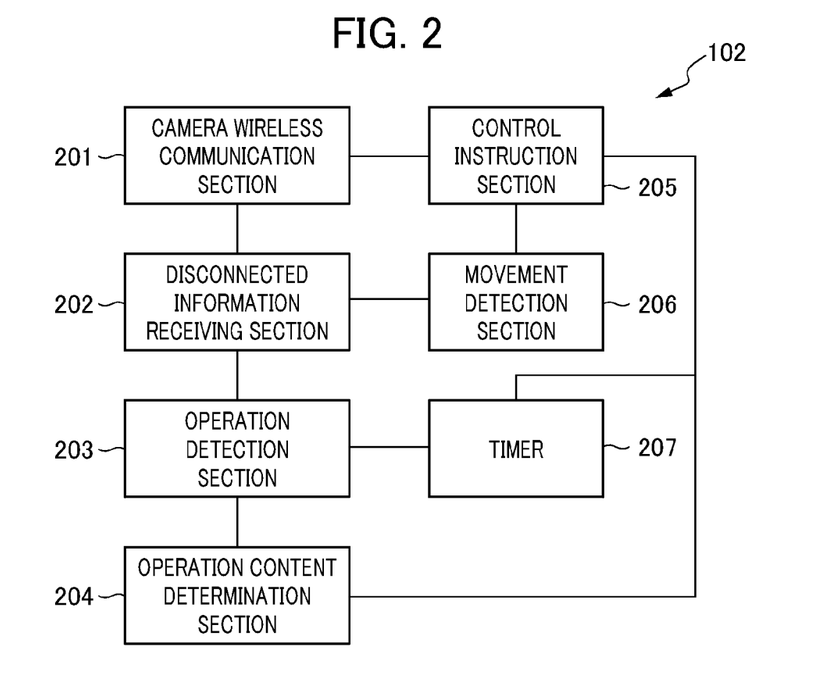
FIG. 2 is a diagram showing an example of the configuration of a camera 102 according to the first embodiment of the present invention.

FIG. 2 shows an example configuration of the camera 102, which is the transmission apparatus according to the present invention. The camera 102 includes a camera wireless communication section 201; a disconnection information receiving section 202; an operation detection section 203; an operation content determination section 204; a control instruction section 205; a movement detection section 206; and a timer 207.

The camera wireless communication section 201 is a communication section with the function of performing wireless communication in the beam mode and the common mode as described above. In other words, the camera wireless communication section 201 transmits data such as moving images, nonmoving images, or sound data to the television 101 via wireless communication in the 60-GHz band. In addition, the camera wireless communication section 201 transmits a control signal supplied from the control instruction section 205, to be described below, to the television 101 via the common mode using a single carrier wave, for example, at about 50 Mbps which is slower than that of the beam mode. This control signal is intended to control an operation in which the television 101 shifts to a state where all or a part of the function thereof is stopped due to the no-signal condition avoidance process for avoiding a no-signal condition in the absence of signal input. The first embodiment includes an instruction for suspending the television 101 so as not to be shifted to the power-off state by the no-signal condition avoidance process.

The disconnection information receiving section 202 is connected to the camera wireless communication section 201. When data being transmitted cannot be received in the beam mode, that is, the beam-mode communication connection has been disconnected, disconnection information indicating that the beam-mode communication connection from the television 101 has been disconnected is transmitted utilizing the common mode. The disconnection information receiving section 202 in the camera receives this disconnection information via the camera wireless communication section 201, and transmits them to the operation detection section 203 and the movement detection section 206. The operation detection section 203 detects whether or not a user has performed an operation with respect to the buttons of the camera 102. The result detected by the operation detection section 203 is transmitted to the operation content determination section 204.

The operation content determination section 204 determines the operation content of the operation detected by the operation detection section 203. The details of the operation content to be determined by the operation content determination section 204 will be described below. The control instruction section 205 instructs the start/stop/reset time measurement with respect to the timer 207. In addition, the control instruction section 205 generates a control signal for suspending the execution of the no-signal condition avoidance process by the television 101. A control signal generated by the control instruction section 205 is transmitted to the wireless communication section 201, and then transmitted to the television 101 using the common mode. The movement detection section 206 is, for example, a gyro sensor or an acceleration sensor, which detects whether or not the camera 102 has been moved, that is, detects the dispositional state of the camera. The timer 207 is used for the control instruction section 205 which monitors whether or not a predetermined period of time has been elapsed.

Figure 3:
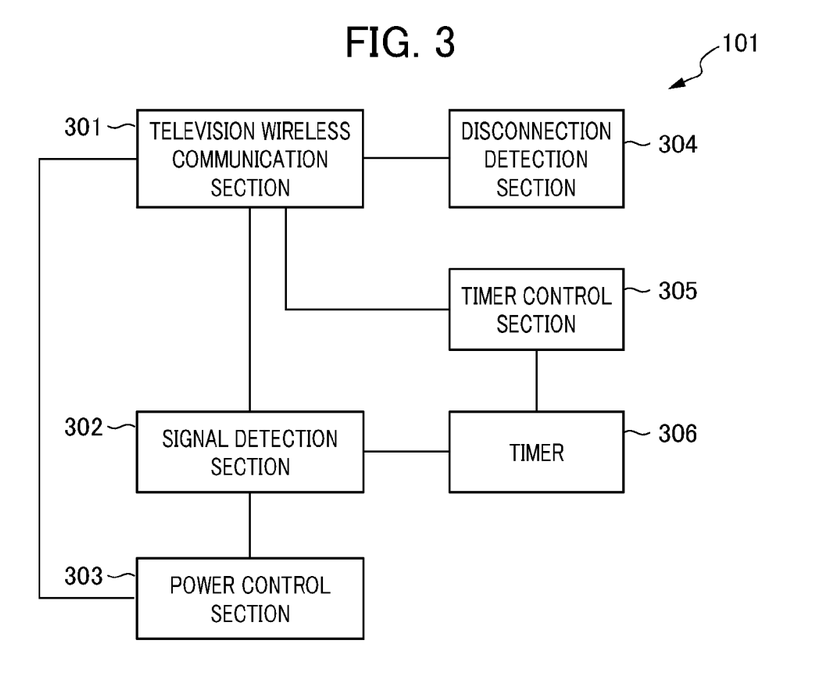
FIG. 3 is a diagram showing an example of the configuration of a television 101 according to the first embodiment of the present invention.

FIG. 3 shows an example configuration of the television 101 which is the receiving apparatus of the present invention. The television 101 includes a television wireless communication section 301; a signal detection section 302; a power control section (state control section) 303; a disconnection detection section 304; a timer control section 305; and a timer 306.

Similar to the camera wireless communication section 201, the television wireless communication section 301 is a communication section with the function of performing wireless communication in the beam mode and the common mode. In other words, the television wireless communication section 301 receives data such as moving images, nonmoving images, or sound data from the camera 102 via wireless communication in the 60-GHz band. Also, the television wireless communication section 301 communicates with the camera 102 via the common mode using a single carrier wave, for example, at about 50 Mbps which is slower than that of the beam mode.

The signal detection section 302 detects the presence or absence of data to be received by the television wireless communication section 301. The power control section 303 controls an on and off operation of the power of the television 101. In particular, if data cannot be received from a first state (operating state) in which the predetermined function of the television 101 is in operation, the power control section 303 carries out control to shift to a second state (power-off state) by the no-signal condition avoidance process for avoiding this no-signal condition. In this particular embodiment, since the power control section 303 controls the power-off operation, the power control section 303 carries out to control that causes the television to transition from the first state to the second state.

The first state herein refers to a general state in which the television 101 is in normal operation, for example, a state that accepts image data to be input from the transmission apparatus to allow reproducing and viewing of the image. The second state herein refers to a state, for example, in which the power supply is switched off corresponding to a data unreceivable state (no-signal condition). However, the second state of the present invention is not necessarily limited only to the power-off state. For example, the second state also refers to the power saving state in which a part of the function or the power supply of the display is only switched off, or the state in which an image based on a broadcast signal (instead of the signal from the transmission apparatus) is displayed on the display. Accordingly, not only the power control section 303 but also the other control sections may be subject to this execution as long as they provide the shift of the state of the television 101 from the first state to the second state. For example, assume that the first state is in a state where data input from the connected device is displayed on the display screen, and the first state undergoes a shift to the second state in which a broadcast image is displayed on the display screen by switching to the input of the broadcast signal. In this case, the control section (not shown) which executes an input switch may execute the aforesaid control.

That is, the content of the no-signal condition avoidance process executed by the television 101 may be any content as long as the process involves a shift from the state which successfully receives a signal from the transmission apparatus and executes signal processing to the state which is different therefrom. However, the execution of a process which only attempts to improve the wireless receiving condition, such as the request for signal transmission to the transmission apparatus or the enhancement of the wireless receiving level of the receiving apparatus itself, in the case where a no-signal condition occurs such that a signal input from the external device is not present, is excluded from the no-signal condition avoidance process. In the case of executing a process for switching to the power saving state or the input state for the broadcast signal after a predetermined period of time period has elapsed while performing a process to improve such a wireless signal condition, such a process falls under the no-signal condition avoidance process according to the present invention.

The disconnection detection section 304 detects when no data is being transmitted in the beam mode from the camera 102, that is, detects that the beam mode-based communication with the camera 102 has been disconnected. The timer control section 305 controls the start/stop/reset time measurement of the timer 306. The timer 306 measures the time elapsed since the absence of a signal input from the external device. In this particular embodiment, in the beam mode-based wireless communication with the camera 102, the time elapsed since the absence of the beam mode-based signal input from the camera 102, that is, the time elapsed since the beam mode-based communication has been disconnected, is measured.

Figure 4:
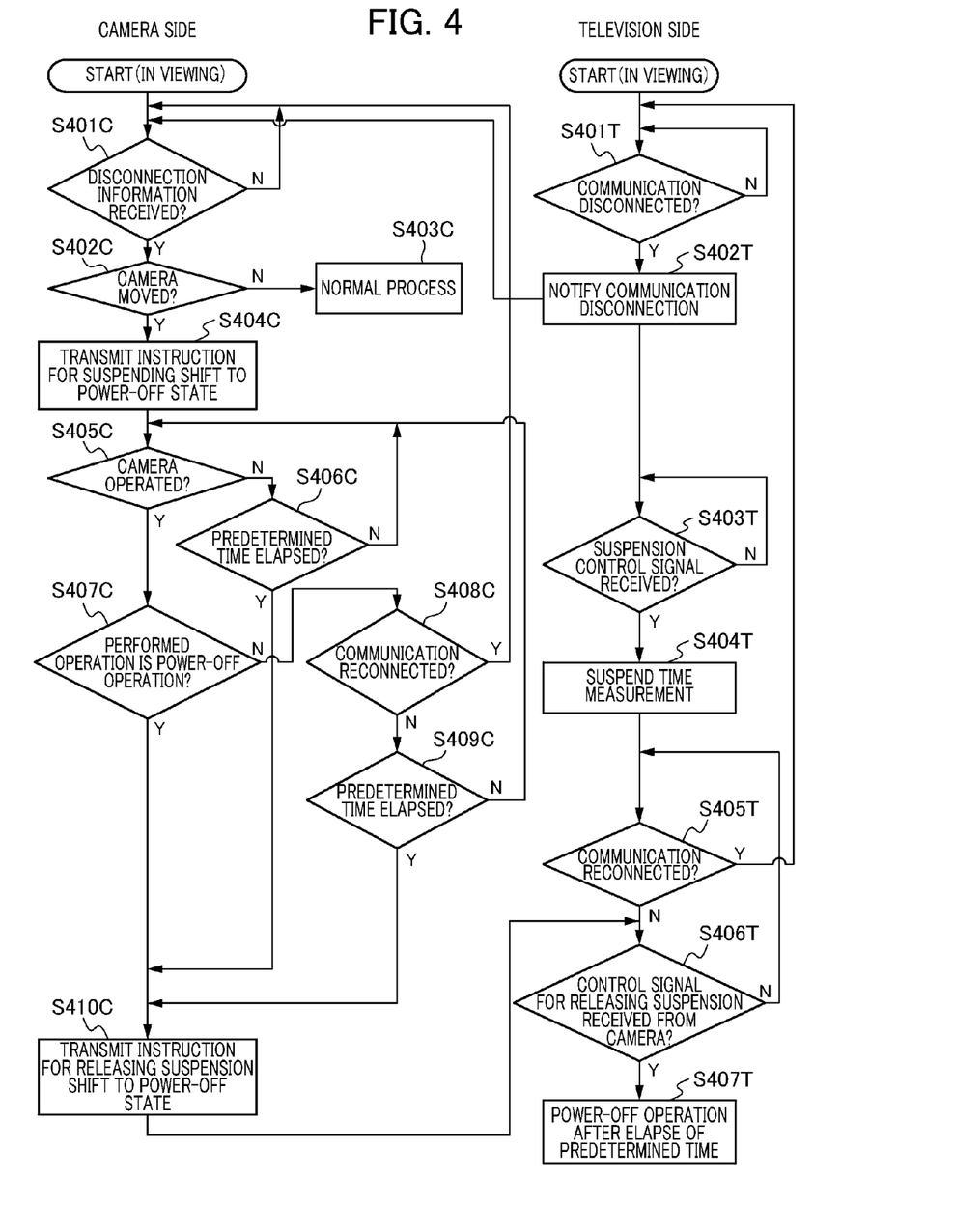
FIG. 4 is a flowchart diagram showing the operation of the information communication system according to the first embodiment of the present invention.

The operation of the information communication system according to the first embodiment of the present invention will now be explained with reference to FIG. 4.

A user connects the camera 102 and the television 101 via wireless communication using the beam mode. Although not described in detail here, communication for authentication utilizing the common mode is executed before the establishment of the connection in the beam mode. The camera 102 transmits the image information data to the television 101 utilizing the beam mode. The television 101 reproduces the image on the display based on the data received, whereby the user can view the reproduced image. At this time, the television 101 is in the first state, that is, the operating state corresponding to a normal external input. Under the state where the camera 102 and the television 101 have been connected as described above, the user moves the position of the camera 102. An exemplary case is such that the user picks up the camera 102 with his/her hands to operate the buttons of the camera 102, resulting in the change of its position.

As explained above, since the beam mode has high directivity, the television 101 may fall in a state where data cannot be received due to the change of the positional relationship between the camera 102 and the television 101. As a result, the beam mode-based communication between the camera 102 and the television 101 is disconnected. The disconnection detection section 304 of the television 101 detects a disconnected state where data cannot be received in the beam mode (step S401T). The television wireless communication section 301 transmits the detection result of the disconnection detection section 304 to the camera 102 via the common mode-based wireless communication (step S402T). The timer control section 305 executes a control for starting time measurement with respect to the timer 306. The subsequent wireless communication is made by the common mode until the connection in the beam mode is resumed.

The disconnection information receiving section 202 of the camera 102 receives disconnection information from the television 101, indicating that the connection in the beam mode has been disconnected (step S401C). As a result of receiving disconnection information, the camera 102 can recognize that the beam mode-based data is not being transmitted to the television 101. If it receives disconnection information, the control instruction section 205 determines whether or not any movement of the camera 102 has been detected by the movement detection section 206 by use of the detection result of the movement detection section 206 (step S402C). The movement detection section 206 always detects the behavior of the camera 102 during the beam mode-based transmission. Hence, in the case where the movement of the camera 102 has been detected immediately before the receipt of disconnection information, it is very likely that the movement of the camera 102 is the cause of disconnection in the beam mode. In view of the above, in step S402C, the movement detection section 206 obtains and determines whether or not the movement of the camera 102 has been detected within a time retroactively for a predetermined time prior to the point of the receipt of disconnection information by the control instruction section 205. A predetermined time for use in determination may be determined arbitrarily in accordance with design factors such as the accuracy of determination.

In the case where the control instruction section 205 determines that the reason for the disconnection of the beam mode is the movement of the camera 102, a suspension control signal is generated for suspending the no-signal condition avoidance process with respect to the television 101. This suspension control signal is intended for preventing the control instruction section 205 from executing the no-signal condition avoidance process, which is the function of the television 101. The generated suspension control signal is supplied to the camera wireless communication section 201. The camera wireless communication section 201 transmits the suspension control signal to the television wireless communication section 301 using the common mode (step S404C). The television 101, which would normally conduct processing for avoiding a no-signal condition, however, waits while suspending the execution of avoidance process due to the receipt of the suspension control signal. In this particular embodiment, the television 101 shifts to the power-off state by executing the no-signal condition avoidance process.

On the other hand, in the case where the movement detection section 206 has not detected the movement of the camera 102 despite the receipt of disconnection information, the control instruction section 205 then determines that the movement of the camera 102 is not the cause of the disconnection in the beam mode. Next, the control instruction section 205 executes a process such as a normal wireless reconnection using the camera wireless communication section 201 (step S403C). This is because, for example, a person may traverse the transmission path of the beam mode or wireless communication may be blocked by an object placed in the transmission path. Since the position of the camera is not changed, reconnection can be readily established if such obstacle is removed. When the movement detection section 206 detects that the connection has been disconnected, it is preferable that the camera 102 execute a control to suspend the reproduction of the image being transmitted to the television 101. The purpose of this is to prevent the camera 102 from continuing the meaningless reproduction in a state where a user cannot view the image, despite the fact that the reproduction image cannot be received in the television 101, in other words, the reproduction image is in a non-presentable state.

The television wireless communication section 301 receives the suspension control signal for suspending the no-signal condition avoidance process from the camera wireless communication section 201 in the common mode (step S403T). The timer control section 305 waits in a state where time measurement using the timer 306 is suspended (step S404T).

The control instruction section 205 receives disconnection information and then operates the timer 207 for time measurement. The timing for starting time measurement is not upon the receipt of disconnection information, but may be after the determination of the movement of the camera (step S402C) or the transmission of the suspension control signal (step S404C). Subsequently, the operation detection section 203 of the camera 102 detects whether or not a user has operated the camera 102 (step S405C). If the operation detection section 203 does not detect any operation performed by a user within a predetermined period of time (step S406C:Y), the process proceeds to step S410C. In step S410C, the control instruction section 205 generates a control signal for releasing the suspension of the no-signal condition avoidance process with respect to the television 102. This control signal is the control signal in use for operating the suspended timer 306 of the television 101 once again. This control signal may also be a signal which directly shifts the television 101 to the second state, that is, shifts the television 101 to the power-off state in this embodiment. Then, the camera wireless communication section 201 transmits this control signal to the television 101 utilizing the common mode. The operation detection section 203 continuously detects whether or not any operation of the camera occurs within a predetermined period of time during which the timer 207 is in measurement.

In step S406T, the television wireless communication section 301 detects whether or not a suspension cancellation control signal for releasing the suspension of the no-signal condition avoidance process is received. In this process, if a suspension cancellation control signal for releasing the suspension of the no-signal condition avoidance process is received from the camera 102, the process proceeds to step S407T, whereby the television 101 resumes the measurement by the suspended timer 306. Once the measurement is resumed, and if no beam mode-based signal input has occurred after the elapse of a predetermined period of time, the television 101 is shifted to the power-off state through the no-signal condition avoidance process.

If the operation detection section 203 of the camera 102 detects an operation performed by a user within a predetermined period of time, the process proceeds to step S407C. In step S407C, the operation content determination section 204 determines the content of the operation. More specifically, if the operation content determination section 204 determines that the operation content is the power-off operation (step S407C:Y), the process proceeds to step S410C. As explained above, step S410C is the step for executing a process for releasing the suspension of the no-signal condition avoidance process of the television 101. This is because the user's operation on the camera 102 is to switch off its power, so that it may be considered that the user has no intention of wirelessly connecting the camera 102 with the television 101 for future use. Hence, a control signal for operating the avoidance process is generated with respect to the television 101 that suspends the no-signal condition avoidance process, and is then transmitted to the television 101. As the respective operation performed in step S410C, step S406T, and step S407T is described above, no further explanation will be given here.

In step S407C, if the operation content determination section 204 determines that the operation content is an operation other than the power-off operation (step S407C:N), the process proceeds to step S408C. In step S408C, the camera wireless communication section 201 determines whether or not the beam mode-based communication has been reconnected. Operations other than the power-off operation include, for example, a menu display operation, and a forward/rewind/cue operation. When the beam mode-based communication is reconnected, the camera wireless communication section 201 receives a signal indicating that it has connected via the common mode from the television 101. By receiving this signal, the control instruction section 205 can determine whether or not the television 101 and the camera 102 have been reconnected in the beam mode. In the case where the beam mode-based communication has not been reconnected (step S408C: N), the control instruction section 205 determines in step S409C whether or not a predetermined period of time has elapsed in a non-connection state. If a predetermined period of time has not elapsed according to the measurement by the timer 207 in this determination step, the control instruction section 205 shifts the process to step S405C. In step S408C, if it is determined that the beam mode-based communication has been reconnected, the control instruction section 205 shifts the process in the camera 102 to step S401C because this means that the camera 102 has returned to the state prior to disconnection in the beam mode.

In step S409C, if it is determined that the beam mode reconnection between the camera 102 and the television 101 has not been executed within a predetermined period of time, the process proceeds to step S410C. The reason is because it is very likely that the user's operation on the camera 102 is not intended to connect the camera 102 with the television 101 in the beam mode. As the process performed in step S410C is described above, no further explanation will be given here. When the communication has been reconnected, a command notifying that the television 101 has been reconnected to the camera 102 utilizing the common mode is to be transmitted. The transmission of this command is not shown in the present flowchart.

On the other hand, after the execution of the above-described processes from step S401T to step S404T, the television 101 is placed in a stand-by mode in step S405T while regularly detecting whether or not the television 101 is reconnected to the camera 102. When the beam mode-based reconnection is executed, the television 101 returns the process to step S401T because this means that the television 101 has returned to the state prior to disconnection. If it is determined by the regular detection in step S405T that the reconnection has not been established, the television 101 determines in step S406T whether or not a control signal for releasing the suspension of the no-signal condition avoidance process has been received from the camera 102. If the television 101 has not received this control signal, the television 101 returns the process back to step S405T and continues the determination process in step S405T. If the television 101 receives this control signal, the process proceeds to step S407T and executes a process similar to that in step S407T described above.

This completes the explanation of the flowchart. In this particular embodiment, the second state is the power-off state. However, if the second state is a state displaying any broadcast program, that is, if the input switching is performed from the external input to the broadcast reception, a control signal generated by the control instruction section 205 in step S410C can also be a signal for switching the display of the television 101 from the external input to the broadcast reception. Specifically, in step S410C, a control signal generated by the control instruction section 205 may be changed appropriately according to an arbitrarily determined second state. Of course, step S406T and step S407T may also be changed according to an arbitrarily determined second state. As described above, it goes without saying that such signal may be a signal for resuming the suspended timer 306.

According to the first embodiment described above, the following effects are produced. In the step of transmitting data such as image information using high-directional wireless communication, the camera 102, which is the transmission apparatus, executes the following controls even in the case of the data unreceivable state. More specifically, the camera 102 carries out to control so as not to make the television 101 which is the receiving apparatus, shift to the second state by executing the process for avoiding a no-signal condition depending on the state of the camera 102 itself. Therefore, when a user performs an operation for the camera 102 and then returns the camera back to its original position, a connection between the camera 102 and the television 101 can be readily established again. Any operation to the television 101 thus becomes unnecessary, and a troublesome reconnection operation can thereby be performed more easily.

Also, when the camera 102 is moved and a further operation is performed, the operation of the television 101 is controlled depending on the operation type, which can thus avoid any state in which any operation is stopped for a long time while the television 101 is being in the no-signal condition.

There are numerous variations regarding the present invention. The variations are now herein discussed below.

(1) In the first embodiment, the camera which is a transmission apparatus transmits an image signal to the television which is the receiving apparatus via wireless communication in the 60-GHz band. Examples of such transmission apparatus include a computer, a digital video camera, or any other information terminal device such as an information terminal equipped with camera. The receiving apparatus may be any apparatus which is capable of reproducing any one of the following information: a nonmoving image, a moving image, a sound, or character information, and an example thereof is a projector.

(2) In the first embodiment, the television, which is a receiving apparatus, is any receiving apparatus for reproducing data such as image information. However, the receiving apparatus is not limited to reproducing data, but may be of any type that performs other data information processing by computer.

(3) While the television suspends the execution of the no-signal condition avoidance process by the instructions from the camera, an indication of waiting for any user's operation with respect to the camera, or any other necessary message may be displayed.

(4) A computer program for realizing components of the camera and the television may be stored on a computer-readable storage (recording) medium. This computer program stored on this storage medium is read into the computer, the camera, or the television respectively for the execution of the computer program, which enables to achieving the information communication system of the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2008-127457 filed May 14, 2008, and Japanese Patent Application No. and 2009-021827 filed Feb. 2, 2009 which are hereby incorporated by reference herein it their entirety.

What is claimed is:

1. A transmission apparatus that performs wireless communication with a receiving apparatus that executes a no-signal condition avoidance process to avoid a no-signal condition, utilizing a first wireless communication mode which employs high-directional radio transmission and a second wireless communication mode which employs low-directional radio transmission with lower directivity than that of the high-directional radio transmission, if a no-signal condition occurs such that a signal input from the transmission apparatus is not present, the transmission apparatus comprising:
 a receiver that receives disconnection information from the receiving apparatus in the second wireless communication mode, wherein the disconnection information indicates that the first wireless communication mode has been disconnected;
 a detector that detects movement of the transmission apparatus;
 a determinator that determines whether or not the disconnection of wireless communication in the first wireless communication mode has been caused by the movement of the transmission apparatus using the result of the detection by the detector if the disconnection information has been received during transmission of data to the receiving apparatus in the first wireless communication mode; and
 a controller that controls transmission of a suspension control signal for suspending the execution of the no-signal condition avoidance process to the receiving apparatus utilizing the second wireless communication mode if it is determined by the determinator that the movement of the transmission apparatus has caused the disconnection of wireless communication in the first wireless communication mode.

2. The transmission apparatus according to claim 1, further comprising an operation detector that detects operation content indicating that a user has performed an action with the transmission apparatus,
 wherein the controller transmits a suspension cancellation control signal for releasing the suspension of the no-signal condition avoidance process to the receiving apparatus utilizing the second wireless communication mode if the operation content detected by the operation detector after the movement of the transmission apparatus is an operation for placing the transmission apparatus in a power-off state.

3. The transmission apparatus according to claim 2, wherein the controller determines whether or not the reconnection of the first wireless communication mode has been established within a predetermined period of time if the operation content detected by the operation detector after the movement of the transmission apparatus is an operation other than the operation for placing the transmission apparatus in a power-off state, and
 wherein the controller transmits a suspension cancellation control signal for releasing the suspension of the no-signal condition avoidance process to the receiving apparatus utilizing the second wireless communication mode if the reconnection has not been established.

4. The transmission apparatus according to claim 1, further comprising an operation detector that detects operation content indicating that a user has performed an action with the transmission apparatus, wherein the controller transmits a suspension cancellation control signal for releasing the suspension of the no-signal condition avoidance process to the receiving apparatus utilizing the second wireless communication mode if the operation detector does not detect any operation for a predetermined period of time after the movement of the transmission apparatus.

5. The transmission apparatus according to claim 1, wherein the no-signal condition avoidance process is a process for placing the receiving apparatus in a power-saving state or a process for switching to an input from a signal other than the signal from the transmission apparatus.

6. A method for controlling a transmission apparatus that performs wireless communication with a receiving apparatus which executes a no-signal condition avoidance process to avoid a no-signal condition, utilizing a first wireless communication mode which employs high-directional radio transmission and a second wireless communication mode which employs low-directional radio transmission with lower directivity than that of the high-directional radio transmission, if a no-signal condition occurs such that a signal input from the transmission apparatus is not present, the method comprising:
  receiving disconnection information from the receiving apparatus in the second wireless communication mode, wherein the disconnection information indicates that the first wireless communication mode has been disconnected;
  detecting movement of the transmission apparatus;
  determining whether or not the disconnection of wireless communication in the first wireless communication mode has been caused by the movement of the transmission apparatus using the result of the detection if the disconnection information has been received during transmission of data to the receiving apparatus in the first wireless communication mode; and
  controlling transmission of a suspension control signal for suspending the execution of the no-signal condition avoidance process to the receiving apparatus utilizing the second wireless communication mode if it is determined that the movement of the transmission apparatus has caused the disconnection of wireless communication in the first wireless communication mode.

7. The method according to claim 6, further comprising detecting operation content indicating that a user has performed an action with the transmission apparatus,
  wherein a suspension cancellation control signal for releasing the suspension of the no-signal condition avoidance process is transmitted to the receiving apparatus utilizing the second wireless communication mode if the operation content detected after the movement of the transmission apparatus is an operation for placing the transmission apparatus in a power-off state.

8. The method according to claim 7, wherein it is determined whether or not the reconnection of the first wireless communication mode has been established within a predetermined period of time if the operation content detected after the movement of the transmission apparatus is an operation other than the operation for placing the transmission apparatus in a power-off state, and
  wherein a suspension cancellation control signal for releasing the suspension of the no-signal condition avoidance process is transmitted to the receiving apparatus utilizing the second wireless communication mode if the reconnection has not been established.

9. The method according to claim 6, further comprising detecting operation content indicating that a user has performed an action with the transmission apparatus,
  wherein a suspension cancellation control signal for releasing the suspension of the no-signal condition avoidance process is transmitted to the receiving apparatus utilizing the second wireless communication mode if any operation is not detected for a predetermined period of time after the movement of the transmission apparatus.

10. The method according to claim 6, wherein the no-signal condition avoidance process is a process for placing the receiving apparatus in a power-saving state or a process for switching to an input from a signal other than the signal from the transmission apparatus.

11. An information communication system comprising:
  a transmission apparatus that transmits data utilizing wireless communication; and
  a receiving apparatus that receives data transmitted via wireless communication from the transmission apparatus,
  wherein the wireless communication between the transmission apparatus and the receiving apparatus utilizes a first wireless communication mode which employs high-directional radio transmission and a second wireless communication mode which employs low-directional radio transmission with lower directivity than that of the high-directional radio transmission,
  wherein the receiving apparatus includes a controller that executes a no-signal condition avoidance process to avoid a no-signal condition if a no-signal condition occurs such that a signal input from a transmission apparatus is not present,
  wherein the transmission apparatus includes:
    a receiver that receives disconnection information from the receiving apparatus in the second wireless communication mode, wherein the disconnection information indicates that the first wireless communication mode has been disconnected;
    a detector that detects movement of the transmission apparatus;
    a determinator that determines whether or not the disconnection of wireless communication in the first wireless communication mode has been caused by the movement of the transmission apparatus using the result of the detection by the detector if the disconnection information has been received during the transmission of data to the receiving apparatus in the first wireless communication mode; and
    a controller that controls transmission of a suspension control signal for suspending the execution of the no-signal condition avoidance process to the receiving apparatus utilizing the second wireless communication mode if it is determined by the determinator that the movement of the transmission apparatus has caused the disconnection of wireless communication in the first wireless communication mode.

12. The information communication system according to claim 11, wherein the no-signal condition avoidance process is a process for placing the receiving apparatus in a power-saving state or a process for switching to an input from a signal other than the signal from the transmission apparatus.

* * * * *